(12) United States Patent
Whitehead et al.

(10) Patent No.: US 7,383,282 B2
(45) Date of Patent: Jun. 3, 2008

(54) METHOD AND DEVICE FOR CLASSIFYING INTERNET OBJECTS AND OBJECTS STORED ON COMPUTER-READABLE MEDIA

(75) Inventors: Anthony David Whitehead, 1647A Bank Street, Ottawa, Ontario (CA) K1V 2Z1; Patrick Ryan Morin, 608-3777 Saint Urbain Street, Montreal, Quebec (CA) H2W 1T5

(73) Assignees: Anthony David Whitehead, Ottawa (CA); Patrick Ryan Morin, Ottawa (CA)

( * ) Notice: Subject to any disclaimer, the term of this patent is extended or adjusted under 35 U.S.C. 154(b) by 974 days.

(21) Appl. No.: 09/978,182

(22) Filed: Oct. 17, 2001

(65) Prior Publication Data

US 2002/0059221 A1    May 16, 2002

(51) Int. Cl.
*G06F 7/00* (2006.01)
(52) U.S. Cl. .................................................. 707/104.1
(58) Field of Classification Search .......... 707/1–104.1
See application file for complete search history.

(56) References Cited

U.S. PATENT DOCUMENTS

| | | | |
|---|---|---|---|
| 5,729,694 A * | 3/1998 | Holzrichter et al. .......... 705/17 |
| 5,732,216 A * | 3/1998 | Logan et al. ................ 709/203 |
| 5,740,283 A * | 4/1998 | Meeker ....................... 382/248 |
| 5,802,361 A * | 9/1998 | Wang et al. ................. 382/217 |
| 5,832,494 A * | 11/1998 | Egger et al. ................. 707/102 |
| 5,867,799 A * | 2/1999 | Lang et al. ..................... 707/1 |
| 5,889,549 A * | 3/1999 | Yasuda et al. ........... 348/14.01 |
| 6,108,609 A * | 8/2000 | Qian et al. ..................... 702/66 |
| 6,119,124 A * | 9/2000 | Broder et al. ........... 707/103 R |
| 6,122,403 A * | 9/2000 | Rhoads ....................... 382/233 |
| 6,185,320 B1 * | 2/2001 | Bick et al. ................... 382/132 |
| 6,195,692 B1 * | 2/2001 | Hsu ............................ 725/110 |
| 6,289,138 B1 * | 9/2001 | Yip et al. .................... 382/307 |
| 6,389,169 B1 * | 5/2002 | Stark et al. ................. 382/225 |
| 6,542,896 B1 * | 4/2003 | Gruenwald .................. 707/101 |
| 6,606,659 B1 | 8/2003 | Heigli et al. |
| 6,684,240 B1 * | 1/2004 | Goddard ...................... 709/217 |
| 6,807,550 B1 * | 10/2004 | Li et al. ...................... 707/201 |
| 6,850,252 B1 * | 2/2005 | Hoffberg ..................... 715/716 |
| 6,876,997 B1 * | 4/2005 | Rorex et al. ................... 707/3 |
| 7,013,285 B1 * | 3/2006 | Rebane ........................ 705/10 |
| 7,171,016 B1 * | 1/2007 | Rhoads ....................... 382/100 |
| 2002/0028021 A1 * | 3/2002 | Foote et al. ................. 382/224 |
| 2002/0174095 A1 * | 11/2002 | Lulich et al. ................... 707/1 |

FOREIGN PATENT DOCUMENTS

JP                08030628 A  *  2/1996

* cited by examiner

*Primary Examiner*—Don Wong
*Assistant Examiner*—Linh Black
(74) *Attorney, Agent, or Firm*—Eugene F. Daranyl

(57) ABSTRACT

A method and device for classifying Internet objects, and/or objects stored on computer-readable media. The method includes an automated method that uses a device to gather information from as many sources as possible within an object, and to analyze and combine this information in order to classify the object.

37 Claims, 12 Drawing Sheets

METHOD AND DEVICE FOR CLASSIFYING INTERNET OBJECTS AND OBJECTS STORED ON COMPUTER-READABLE MEDIA

FIELD OF THE INVENTION

This invention relates to a method and device for classifying Internet objects, and/or objects stored on computer-readable media. More particularly, this invention relates to a method and device for classifying Internet objects on the basis of adult content, using an automated web robot, as well as a method and device for classifying objects stored on computer-readable media, using a classification module stored on a computer system.

BACKGROUND OF THE INVENTION

An Internet object is anything that is downloaded or transmitted via the Internet, including but not limited to web pages, images, text documents, email messages, newsgroup postings, chat text, video, and audio. Given the tremendous increase in the size and variety of the Internet community in recent years, classification of Internet objects has become increasingly important, and manual classification of Internet objects is becoming increasingly inadequate.

Internet objects can be classified by the subject matter they contain. One practical application of such classification is the ability to filter Internet objects based on classification. There is particular interest in classifying Internet objects containing adult content because access to such Internet objects can then be restricted to prevent viewing by minors.

Internet filtering products have previously been developed to attempt to filter Internet objects based on adult content. All filtering products require a method by which to classify Internet objects. The prior art methods of classification are detailed below, but can be summarized as taking one of three approaches: (i) filtering based on classification information embedded in an Internet object; (ii) compilation of "blacklists" and/or "whitelists" that filtering products may reference; and (iii) real-time textual analysis.

One Internet filtering product is produced by Netscape as part of the Netscape web browser. The browser includes an adult content filtering feature that classifies web pages based on the PICS labeling system, a voluntary system by which Internet content providers include special codes in their Internet objects (in this case web pages) to describe the content of the object. The PICS labels are the only mechanism used by Netscape in classifying the adult content of web pages. The PICS system is described in greater detail at http://www.w3.org/pics/. The drawback in relying solely on the PICS label to classify Internet objects is that not all sites are classified using the system, as participation in the PICS system is voluntary. In addition, there is no independent verification process, and users rely solely on the judgement of the Internet content providers, which may be biased by self-interest.

Cyber Patrol is another Internet filtering product. Cyber Patrol maintains a "blacklist" of web sites that are considered to contain adult content. The Cyber Patrol web page at http://www.cyberpatrol.com/discloses that "professional researchers compile" the lists, apparently manually. With the current growth rate of Internet users and Internet content providers, the current method of manual classification is inadequate.

SurfWatch [http://www1.surfwatch.com/] is another Internet filtering product that works by maintaining blacklists. SurfWatch appears to search web pages and URLs for restricted keywords. Any page or URL containing a restricted keyword is classified as adult content. There is no further initial verification process. This can lead to a site being erroneously classified as adult, as illustrated in the recent incident in which one of the pages on the "Whitehouse for Kids" website was classified as adult content because it was named "couples.html".

CYBERsitter is yet another Internet filtering product that attempts to classify web sites, by looking at the text of the page and URLS. The product removes profane English words from the text of web pages, but does not filter out pornographic images from web pages which do not contain text and does not filter out words that are profane words in foreign languages.

NetNanny [http://www.netnanny.net/] is still another Internet filtering product that uses a blacklist of domain names of web sites not suitable for children. The NetNanny web site discloses that the NetNanny site list is compiled by NetNanny staff, the suggestions of customers, and third party children's advocacy groups. The ability of the product to filter out undesirable sites is limited by the comprehensiveness of the blacklist, which is compiled manually.

In sum, given the rapid proliferation of Internet objects, manual classification of Internet objects is an inadequate method of classification. Similarly, the use of unweighted or unverified text filtering alone results in inadequate and often inaccurate classification of Internet objects. Given the growing availability of adult content on computer-readable media, there is also need for a method and device that can more accurately and efficiently identify adult content on computer readable media, and either filter or deny access to such adult content.

The present invention can also be used to classify Internet objects and/or objects stored on computer readable media based on other criteria besides adult content.

SUMMARY OF THE INVENTION

An object of the present invention is to address the limitations of the prior art with respect to classification methods and devices for Internet objects (i.e. anything that is downloaded or transmitted via the Internet, including but not limited to web pages, images, text documents, email messages, newsgroup postings, chat text, video, and audio). The present invention addresses the limitations of the prior art by producing an automated method and device which more accurately classifies Internet objects.

Another object of the present invention is to build a database of Internet URLs (universal resource locators) that contain Internet objects that exceed a tolerated threshold for adult content, for use upon executing Internet access via any communications port in any type of computer in order to filter or block access to Internet objects that contain adult content.

The above objects are met by the method and device of the invention, which uses weighted textual analysis supplemented by an analysis of Internet content other than text content (such as images, video, link relations, and audio) which are relevant and useful to properly classify an Internet object.

Accordingly, the invention relates to a method and device that classifies an Internet object by calculating a coefficient of adult content ("CoAC") using the following steps:

(a) computing the following individual data type coefficients (i) the descriptor coefficient, (ii) the name coefficient, (iii) the text coefficient, (iv) the image coefficient, (v) the audio coefficient, (vi) the video coefficient, (vii) the plug-in coefficient, and (viii) the relationship coefficient, and calculating a weighted number to describe the CoAC;

(b) building and maintaining a database of URLS which contain Internet objects that exceed the tolerated threshold for adult content, for use upon executing Internet access via any communications port in any type of computer for the purpose of filtering access to such identified URLs.

The method can be used to classify Internet objects based on any combination of the above data type coefficients, and possibly other criteria.

Another object of the present invention is to address the limitations of prior art with respect to classification methods and devices for objects stored on computer-readable media, such as floppy discs, hard discs, CD-ROM, CD-R, CDRW, and any other computer-readable information storage device. In this context, "object" refers to anything that can be stored on such memory devices, including but not limited to images, text, video, and audio objects. The present invention addresses the limitations of the prior art with respect to classification methods and devices for objects stored on computer-readable media by producing an automated method and device which more accurately classifies objects stored on computer-readable media.

Another object of the present invention is to identify objects stored on computer-readable media that exceed a tolerated threshold for adult content, in order to filter or deny computer access to such objects.

The above objects are met by the method and device of the invention, which uses weighted textual analysis supplemented by an analysis of content of the object stored on computer-readable media other than text content (such as images, video, and audio) which are relevant and useful to properly classify an Internet object.

Accordingly, the invention relates to a method and device that classifies an object stored on computer-readable media by calculating a coefficient of adult content ("CoAC") using the following steps:

(a) computing the following individual data type coefficients (i) the text coefficient, (ii) the image coefficient, (iii) the audio coefficient, and (iv) the video coefficient, and calculating a weighted number to describe the CoAC;

(b) filtering or denying computer access to objects stored on computer-readable media that exceed the tolerated threshold for adult content.

The method can be used to classify objects stored on computer-readable media based on any combination of the above data type coefficients, and possibly other criteria.

Another object of the present invention is to use one or more of the classification methods outlined in detail below to classify Internet objects and objects stored on computer-readable media on the basis of any other identified criteria or parameter besides adult content.

Numerous additional features and aspects of the methods and device of the present invention are set forth in the detailed description that follows.

BRIEF DESCRIPTION OF THE DRAWINGS

The invention is described below in greater detail with reference to the accompanying drawings, which illustrate a preferred embodiment of the invention, and wherein.

DESCRIPTION OF THE PREFERRED EMBODIMENTS

Figure 1:
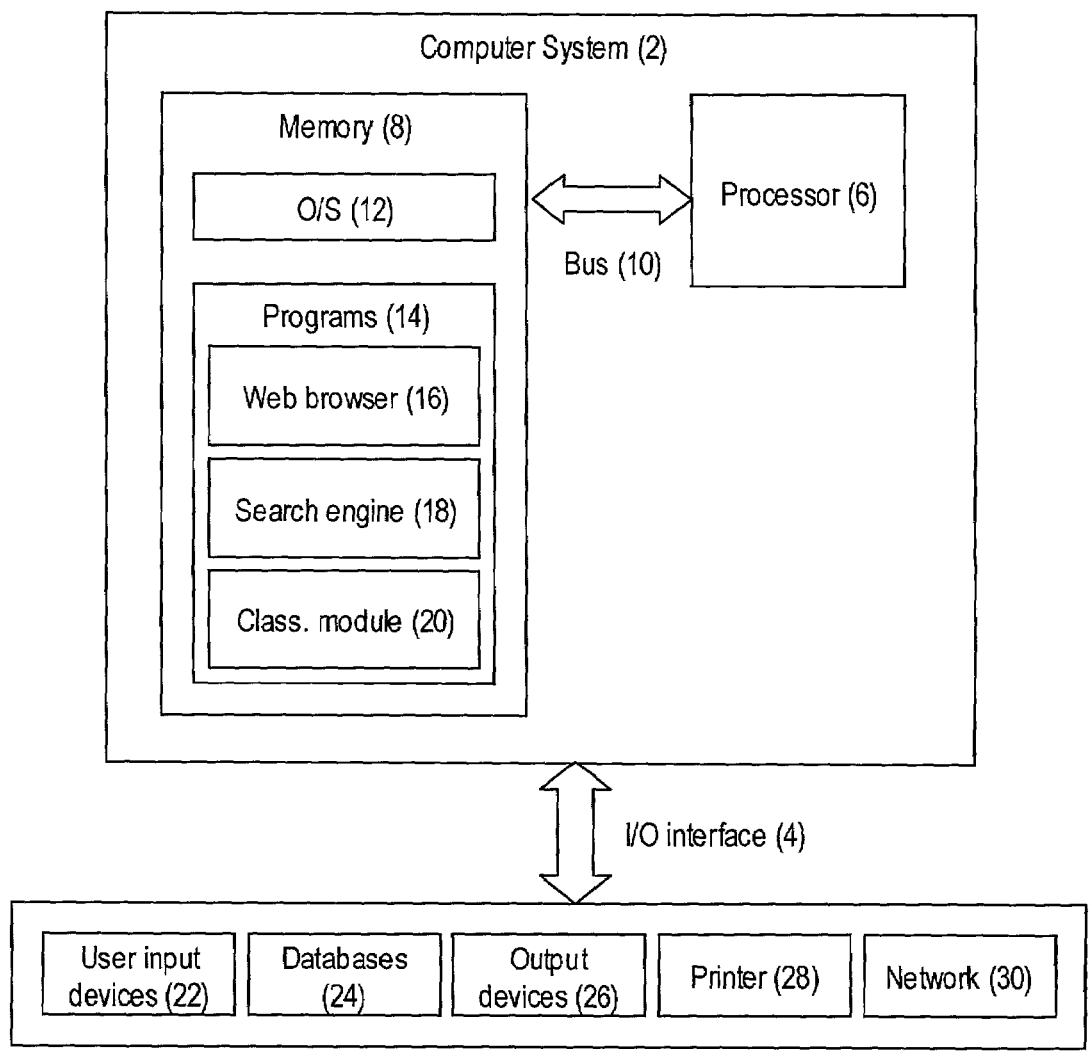
FIG. 1 is a block diagram of a computer system that can be used to implement one or more different embodiments of the present invention.

The device which performs the method of classification of Internet objects and objects stored on computer-readable media as described herein is illustrated in FIG. 1. FIG. 1 is a high-level block diagram of a system (2) that can be used to implement one or more different embodiments of the present invention. As illustrated, the system includes a computer system (2) which itself comprises an input/output interface (4), a processor (6), and a memory (8) all conventionally interconnected by bus (10). Memory (8), which generally includes different modalities, all of which are not specifically shown for simplicity, may be implemented using random access memory (RAM), hard disk storage and/or other removable media devices, such as floppy disks, magnetic tape and CD-ROM drives, which are capable of reading information stored on a computer-readable medium such as a CD-ROM, CD-R, and CD-RW. In accordance with the present invention, the memory (8) stores an operating system (O/S) (12) and a variety of application programs (14). The application programs include an Internet browser (16), a search engine (18), and a classification module (20).

The computer system is coupled to a plurality of data sources via the input/output interface (4) and a bidirectional bus (10). The data sources include user input devices (22) such as a keyboard and/or mouse, a plurality of external databases (24), and a plurality of additional external information sources, including those accessed via the network (30). The additional information sources, of which only a few are specifically shown (24, 30), can include, e.g., an Internet connection via the network (30) and a broadcast receiver such as a television or satellite receiver. Inasmuch as the present invention will function with stored information, e.g., data, regardless of its source, the particular modality through which such data is physically provided to the computer system is immaterial.

In addition to coupling the computer system to a plurality of external data sources, the input/output interface (4) electrically connects and interfaces the computer system to a plurality of output devices (26). The output devices could include, e.g., a display, such as a conventional colour monitor, and printer (28), such as a conventional laser printer or other well-known printer. In addition, the input/output interface (4) may be used to electrically connect and interface the computer system to a plurality of memory storage devices (8).

A user can invoke an application program or software module implementing the present invention through appropriate commands entered via user input devices (22) and/or in response to selecting a program icon appearing on display (26) that represents the application.

The first exemplary embodiment of the invention classifies Internet objects by using an automated web robot whose goal is to find Internet pages with adult content. In order to understand how the robot navigates the Internet, it is necessary to understand the differences in the levels of addressing required to identify Internet objects. At the highest level, Internet addresses are governed by unique "domain names", such as playboy.com. Once granted this domain name, the owners of the domain name can set up computers that post Internet content at the "website" located at http://www.playboy.com/. This Internet content takes the form of individual web pages. An Internet object that contains links to individual web pages is known as a directory. An example of a directory is http://www.playboy.com/sex/. Each individual web page has a unique address, known as a universal resource locator, or URL. An example of a URL is http://www.playboy.com/sex/morsex.html. The robot works by visiting and classifying Internet objects at individual URLs.

The robot takes as input a list of URLs and visits each one of them. At each site, the robot performs the classification analysis set out in detail below. At each site, the robot determines whether to add any new URLs found to its visitation list. This analysis is based on the level of adult content found on the URL. The robot maintains a list of URLs already visited so that no URL is visited more than once.

The robot builds and maintains a database of URLs which contain Internet objects which exceed the tolerated threshold for adult content. The database can be referenced upon executing Internet access via any communications port in any type of computer. Upon execution of Internet access, the database of URLs with adult content is referenced in order to block or filter access to Internet addresses that have been identified as having adult content that exceeds the tolerated threshold.

The invention uses a combination of text, image, video, sound, and relational analysis to determine whether a particular Internet object contains adult content, all without the need for human assessment. For the purposes of this invention, and all other embodiments of the invention and/or sub-inventions described below, adult content is defined as anything not suitable for viewing by a minor, including violence/profanity, partial nudity, full nudity, sexual acts, gross depictions, intolerance, drugs/drug culture, militant/extremist propaganda, illegal acts, and alcohol/tobacco advertisements.

Figure 2:
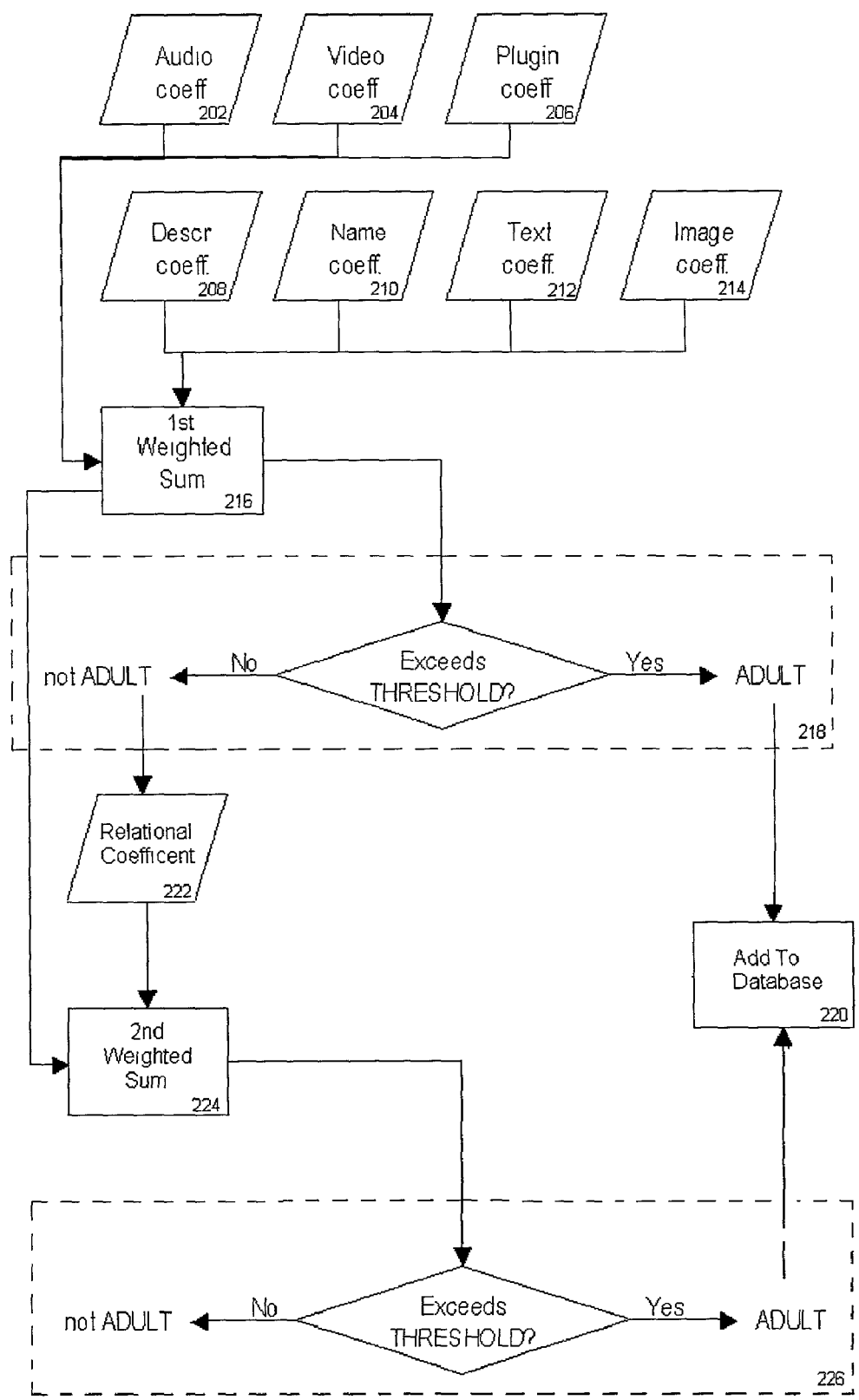
FIG. 2 is a flow chart of the calculation of the eight coefficients and the calculation of the weighted sum or sums used to classify an Internet object.

FIG. 2 illustrates the calculation of the eight coefficients and the calculation of the weighted sum or sums used to classify an Internet object. The invention automatically computes, without human intervention, seven different values, or data type coefficients (audio coefficient (202), video coefficient (204), plug-in coefficient (206), descriptor coefficient (208), name coefficient (210), text coefficient (221), and image coefficient (214)). The steps for calculating the various data type coefficients are described in greater detail below.

The invention then combines the various data type coefficients, using a weighting scheme, into one value, (the first weighted sum (216)), called the coefficient of adult content ("CoAC") (216). The weighting scheme for the first weighted sum (216) can be determined automatically or can be adjusted by the user to reflect the relative acceptability of the adult content signalled by the various data type coefficients. The weighting scheme can also be adjusted to take account of other factors, such as the prevalence of various data types in an Internet object. For example, in a Internet page (defined as any logical unit of Internet content that can be downloaded using any transmission protocol) that contains 10 pictures and 5 words, more weight could be given to the image data type coefficients in the computed CoAC for the object.

After computing the first seven data type coefficients, and producing the first weighted sum (the CoAC (216)), the CoAC (216) is compared against a user-specified threshold value (218). Any object with a CoAC (216) exceeding the threshold value is classified as containing adult content, and is added (in step 220) to a database containing the URLs of sites which contain Internet objects that exceed the tolerated threshold for adult content.

Internet objects that are not classified as adult content on the basis of the CoAC (216) computed using the first seven data types (i.e. the audio coefficient (202), video coefficient (204), plugin coefficient (206), descriptor coefficient (208), name coefficient (210), text coefficient (221), and image coefficient (214)), are classified using a relational coefficient (222).

Once the relational coefficient (222) is computed, using the steps described in greater detail below, a second weighted sum (224) is computed, using the relational coefficient (222), as well as the other seven data type coefficients (i.e. the audio coefficient (202), video coefficient (204), plugin coefficient (206), descriptor coefficient (208), name coefficient (210), text coefficient (221), and image coefficient (214)). The weighting scheme for the second weighted sum (224) can be determined automatically or can be adjusted by the user to reflect the relative acceptability of the adult content signalled by the various data type coefficients. The weighting scheme can also be adjusted to take account of other factors, such as the prevalence of various data types in an Internet object. For example, in a Internet page (defined as any logical unit of Internet content that can be downloaded using any transmission protocol) that contains 10 pictures and 5 words, more weight could be given to the image data type coefficients in the computed CoAC for the object.

After computing the eight data type coefficients, and producing the second weighted sum (the CoAC (224)), the CoAC (224) is compared against a user-specified threshold value (226). Any object with a CoAC (224) exceeding the threshold value is classified as containing adult content, and is added (in step 220) to a database containing the URLs of sites which contain Internet objects that exceed the tolerated threshold for adult content. Any object with a CoAC (224) below this threshold is ignored.

The method can be used to classify Internet objects based on any combination of the data type coefficients described below, and possibly other criteria.

The Descriptor Coefficient

Many Internet objects have identifiers embedded in the object, known as meta data. Meta data is information stored within the Internet object. It is not normally visible to the viewer of an Internet object, but is machine-readable, and provides information about the Internet object that can be used by computer applications. Examples of meta data include the computer language in which the Internet object is written, the author or creator of the Internet object, and keywords that describe the Internet object.

Internet content providers currently have the option of embedding voluntary rating labels in the meta data of their Internet objects. There exist several such labelling systems. All of these systems allow an analysis of the content provider's opinion on whether the object contains adult content. The emerging standard in labelling systems is the PICS label system, whereby providers of Internet content voluntarily rate their Internet objects in terms of the amount of adult content (namely nudity, sex, violence and profane language) contained in the Internet object. A complete description of the rating guide for PICS values can be found at: http://www.icra.org/ratingsv01.html. In essence, however, the nudity, sex, violence and profane language in the content of each Internet object is rated on a scale of zero to four, with four representing the most adult content in each of the categories.

For example, the PICS label for the web page http://www.playboy.com/index.html consists of the following single line of meta text:

"<meta http-equiv="pics-label" content='(pics-1.1 "http://www.rsac.org/ratingsv01.html" L gen true comment "RSACi North America Server" for http://www-.playboy.com on "1996.05.04T06:51-0800" r (n 4 s 3 v 0 1 4))'>".

The actual PICS rating is found in the very last portion of the PICS label, and it tells a reader that the content provider of the Playboy website has rated the level of nudity on the site as a four out of four, the level of sex on the site sex as a three out of four, the level of violence on the site as a zero out of four, and the level of profane language on the site language as a four out of four.

Figure 3:
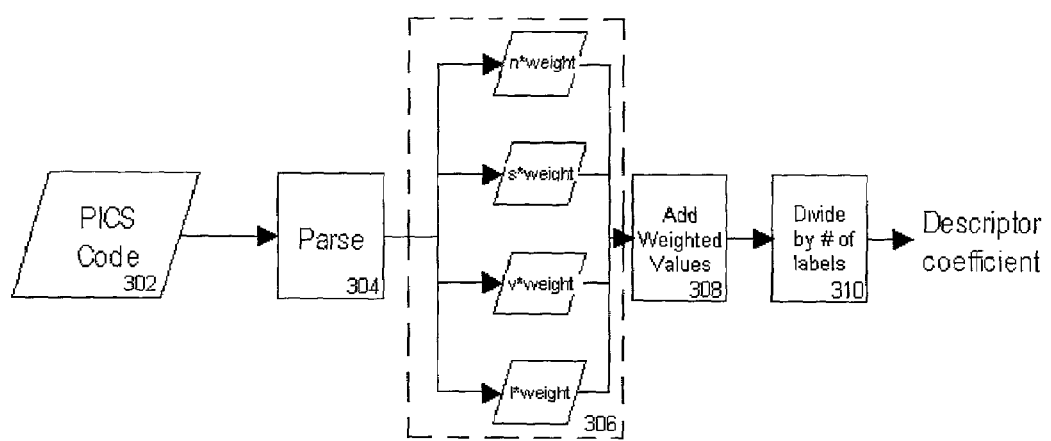
FIG. 3 is a flow chart of the calculation of the descriptor coefficient for a PICS code.

FIG. 3 illustrates the calculation of the descriptor coefficient for a PICS code. As illustrated, the PICS code (302) of an Internet object is read by the device of the invention and the individual elements of the PICS code, known as labels, are parsed (304). The labels are weighted to reflect the relative acceptability of the adult content signalled by the various items rated by the PICS label. The weighting scheme can be determined automatically or determined by the user. The ratings of the labels are multiplied by their weighting (306) and an average PICS code rating is determined by adding the weighted values (308) and dividing by the number of PICS labels (310). The pseudocode for computing the descriptor coefficient is as follows:

1. PICScoef=0
2. for each label in the PICS
2.1 PICScoef=PICScoef+(label value*weight)
2.2 PICScoef=PICScoef/#labels
3. output PICScoef The Name Coefficient Internet objects have identifiers, such as file names, directory names, domain names, URLs, etc. In most cases, these identifiers are chosen in some meaningful way that makes it possible to gain information about the Internet objects from their names.

A list of keywords that are likely to indicate adult content is developed. The keyword list can be developed in a plurality of ways, including an analysis of the content of Internet objects with adult content, or by incorporation of a user-identified list of keywords. Each keyword is given a weight, such that a higher weight is given to words that are more likely to indicate adult content. Examples of keywords might be slang terms for sexual organs, slang terms for sexual acts, profanities, and slang terms for sexual orientations. Proper names for sexual organs or other such clinical terms are either not included in the list or given a very low weight.

Figure 4:
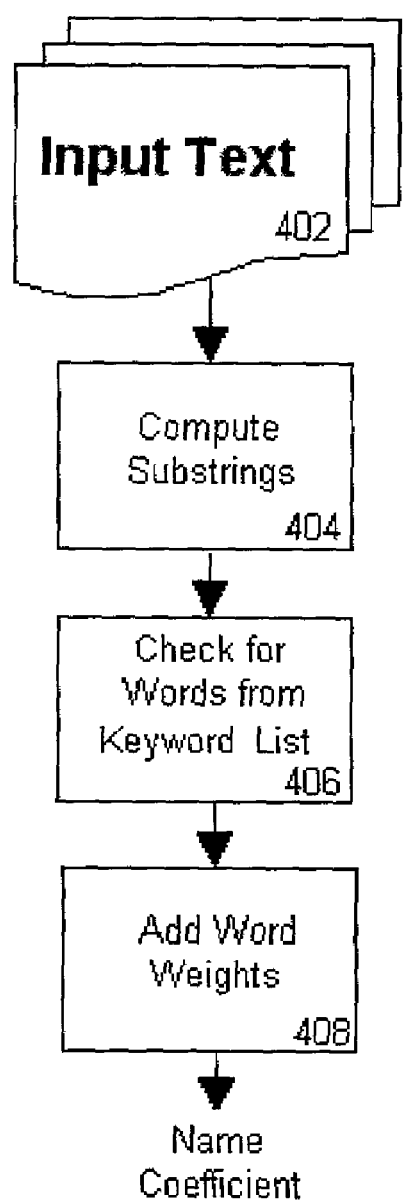
FIG. 4 is a flow chart of the calculation of the name coefficient.

FIG. 4 illustrates the calculation of the name coefficient. The robot obtains the text file identifiers of an Internet object (402), and analyzes each name. The robot computes all possible substrings contained in the name being analyzed (404). The robot accesses and uses the keyword list in calculating the name co-efficient, by checking for matches of words in the keyword list (406). The robot then calculates the name coefficient by adding the weights of all weighted keywords found in all substrings (408).

The pseudocode for computing the name coefficient is as follows.

1. set namecoeff=0
2. for each substring, s, in the object's name
2.1. if s is in the name keyword list
2.1.1. namecoeff=namecoeff+the weight of s
3. output namecoeff The Text Coefficient Many Internet objects, such as email messages, text documents and web pages, contain a text component. In such cases, the text can be analyzed to determine if it contains adult content.

As set out above, a list of keywords that are likely to indicate adult content is developed. In addition, a list of phrases likely to indicate adult content is developed in order to capture separate words that may not indicate adult content on their own but may do so in a phrase (e.g. "18 or over"). The phrases for the keyword list can be developed in a plurality of ways, including an analysis of the content of Internet objects with adult content, or by incorporation of a user-identified list of phrases. Each keyword and phrase is given a weight, such that a higher weight is given to words that are more likely to indicate adult content.

Figure 5:
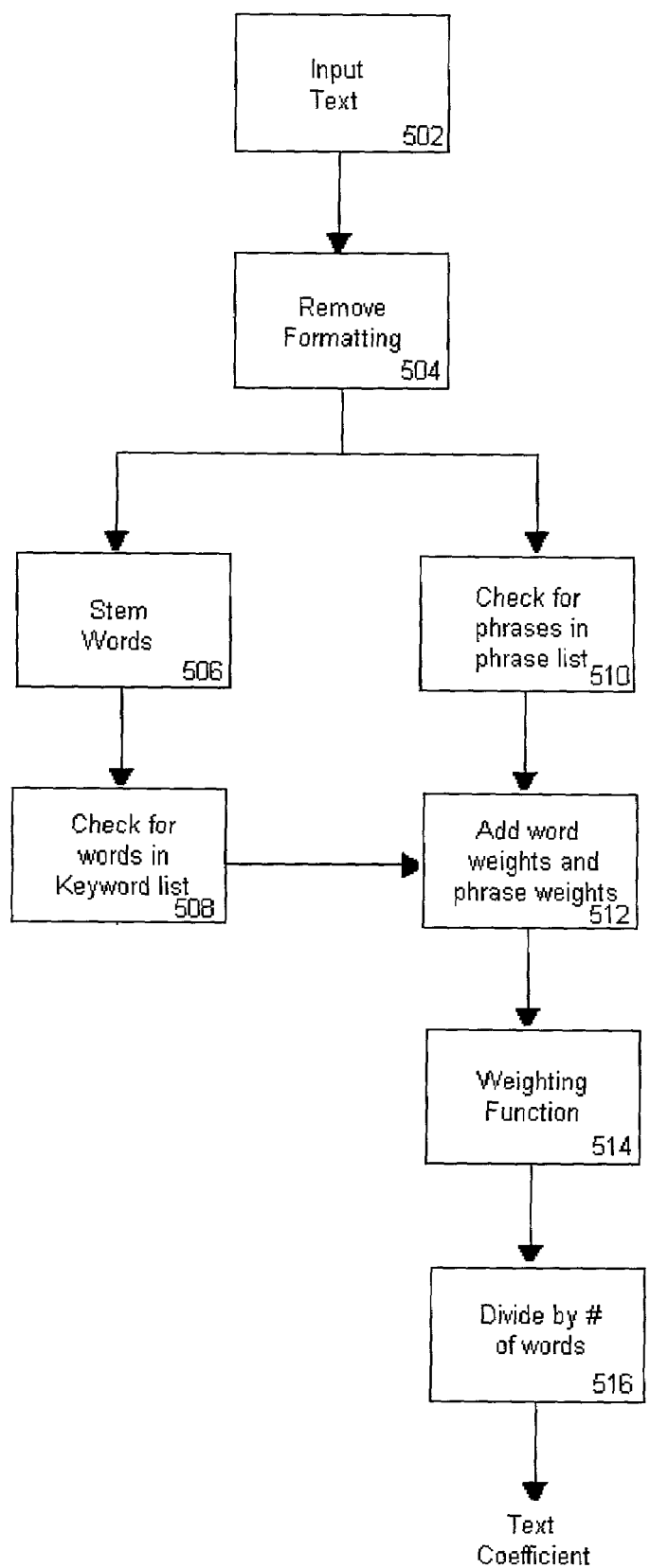
FIG. 5 is a flow chart of the calculation of the text coefficient.

FIG. 5 illustrates the calculation of the text coefficient. The robot retrieves the text contained in an Internet object (502). The robot eliminates, where necessary, any formatting from the text of the Internet object to obtain an unformatted text (504). Next, the robot reduces each individual word in the unformatted text to a stem (506), using any known stemming algorithm, for example the Porter stemming algorithm [Porter, M. F., 1980, An Algorithm for Suffix Stripping, *Program* 14(3): 132-137]. The resulting word stems are then compared to the weighted keyword list (508). In addition, the text is searched for key phrases that exactly match key phrases in the weighted key phrase list (510). The first step in developing the numerator of the text coefficient is to add the weights of all weighted keywords found in all stemmed words and the weights of all weighted key phrases found in the original text (512). The second step in calculating the numerator of the text coefficient is to multiply the total of the weights of all stemmed words and all key phrases by a constant, which may be determined automatically or determined by the user (514). The constant, which is a mathematical function of the total number of words in the Internet object, functions as a scaling factor (or weighting factor). The denominator of the text coefficient is the number of words in the Internet object (516). The text coefficient is calculated by dividing the numerator by the denominator.

The pseudocode for this process is as follows.
1. set textcoeff=0
2. remove all formatting from the text
3. for each word, w, in the text do
3.1. reduce w to a canonical form to get a word-stem, s
3.2. if s is in the stem keyword list then
3.2.1. set textcoeff=textcoeff+the weight of s
4. for each phrase, p, in the key phrase list do
4.1. let n=the number of occurrences of p in the text
4.2. set textcoeff=textcoeff+n*the weight of p
5. set textcoeff=textcoeff*k/number of words in the text, where k is a user-defined or automatically generated constant value
6. output textcoeff The Image Coefficient When an Internet object contains image data, or is an image itself, the image data can be analyzed to determine whether it contains adult content. Computation of the image coefficient proceeds using the following steps. First, a range of Hue-Saturation-Value ("HSV") colour space values that are classified as skin tones is developed, and provided to the robot for access and use during the classification process. [For an explanation of HSV colour space, see Gonzales and Woods, "Digital Image Processing", Addison Wesley, Reading Mass., 1992.]

Skin tone ranges can be developed in a plurality of ways, including reliance on prior art. [See, for example, Forsyth and Fleck, "Automatic Detection of Human Nudes", *International Journal of Computer Vision* 32/1, pp. 63-77, 1999]. The invention can use a skin tone range in which skin tone is defined as any pixel with Hue values between 0 to 25 (of a maximum 180) and Saturation values between 50 and 230 (of a maximum 255). This range may be further refined by statistical analysis of data settings, as optimal parameters depend on the data set being analyzed. The preferred embodiment of the invention uses a skin tone range in which skin tone is defined as any pixel with Hue values between 2 to 18 (of a maximum 180) and Saturation values between 80 and 230 (of a maximum 255). This range may also be further refined by statistical analysis of data settings, as optimal parameters depend on the data set being analyzed.

Figure 6:
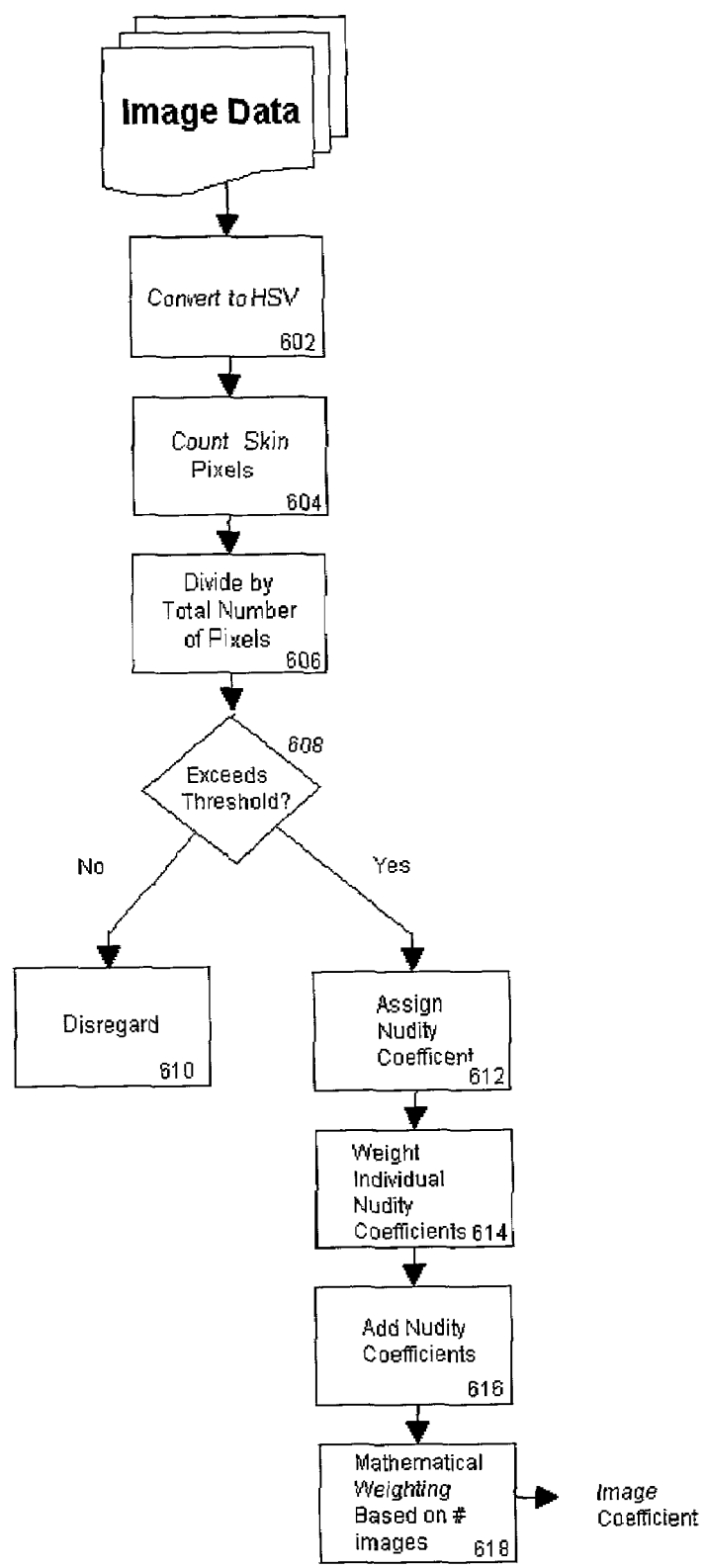
FIG. 6 is a flow chart of the calculation of the image coefficient.

FIG. 6 illustrates the calculation of the image coefficient. When the robot is reviewing images in an Internet object, the robot begins by converting the colour of the Internet object into the HSV colour space (602). The robot then compares every pixel of the Internet object image to identify which pixels fall within the skin tone ranges it has been provided (604).

The identification of such skin tone ranges is itself an improvement of the prior art, in that the transformation from Red/Green/Blue colour space to the HSV colour space before analysis allows a more accurate identification of skin type pixels.

The robot then divides the number of skin tone pixels in the Internet object image by the total number of pixels in the image (606). The robot compares the resulting value against an automatically generated or user-defined threshold value (608). If the resulting ratio is less than the threshold proportion of skin pixels, then the robot disregards the image (610). Each image in an Internet object that meets or exceeds the threshold proportion of skin pixels is assigned a nudity coefficient equal to the percentage of skin pixels in the image (612). The nudity coefficient of each image in an Internet object can also be weighted (614) using a plurality of factors, including, but not limited to, the size of the image (with larger pictures getting a heavier weight) and the encoding type (with images in formats with more accurate colour ranges getting a higher weight).

The image coefficient is calculated by adding the weights of all weighted nudity coefficients generated by an Internet object (616), and then multiplying that total by a constant, which may be determined automatically or determined by the user (618). The constant, which is a mathematical function of the total number of images in the Internet object, functions as a scaling factor (or weighting factor).

Figure 7:
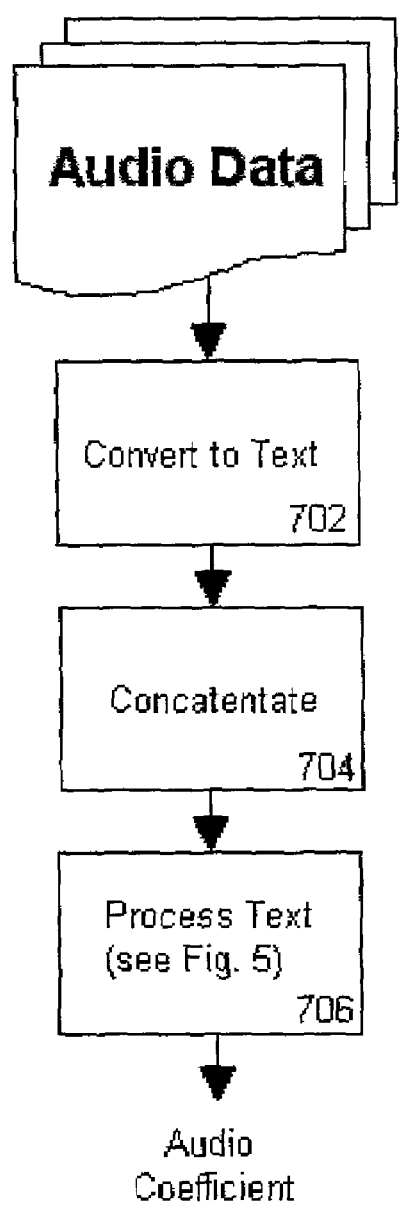
FIG. 7 is a flow chart of the calculation of the audio coefficient.

The pseudocode for this process is as follows.
1. set imagecoeff=0
2. for each image, i, in the object do
2.1. set skincount=0
2.2. for each pixel, p, of i do
2.2.1. if 2<=hue(p)<=18 and 80<=saturation(p)<=230 then
2.2.1.1. set skincount=skincount+1
2.3. set skincount=skincount/number of pixels in i
2.4. set imagecoeff=imagecoeff+skincount*weight
3. if number of images>0
3.1. set imagecoeff=imagecoeff/log2 (number of images)
4. output imagecoeff The Audio Coefficient Certain audio data can be transcribed into text, and the resulting transcription can be analyzed and classified, using the textual classification methods previously described. FIG. 7 illustrates the calculation of the audio coefficient. To obtain the audio coefficient, audio components in the Internet object are converted to unformatted text (702) using any known speech recognition algorithms (for example Dragon Naturally Speaking available from Dragon Systems, Inc.). The resulting texts are then put together (concatenated) (704) and their text coefficient is computed in the same manner as the method discussed with respect to the text coefficient above (706). The result is the audio coefficient.

Figure 8:
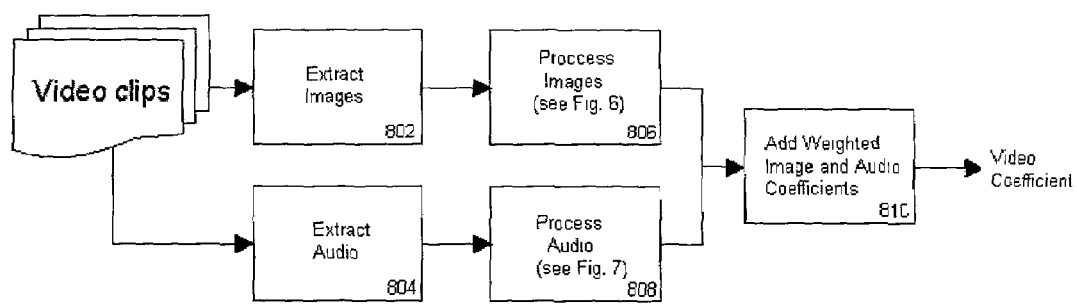
FIG. 8 is a flow chart of the calculation of the video coefficient.
Figure 9:
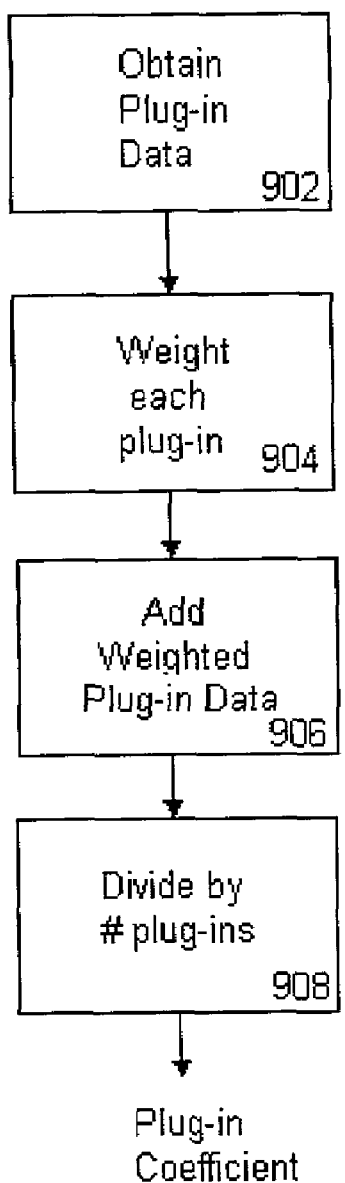
FIG. 9 is a flow chart of the calculation of the plug-in coefficient.

The pseudocode for this process is as follows.
1. set audiocoeff=0
2. set text=null
3. for each audio stream, s, in the object do
3.1. convert s to text to obtain text t
3.2. append t to text
4. set audiocoeff=the text coefficient of extracted text
5. output audiocoeff The Video Coefficient Video data contains components of both audio and image data. FIG. 8 illustrates the calculation of the video coefficient. The invention analyzes video data by first dividing the video data into image data (802) and audio data (804) as required by the media type. The resultant image data is evaluated using the image coefficient method (806), and an image coefficient is assigned for each frame of video data. The resultant audio data is evaluated using the audio coefficient method (808), and an audio coefficient is assigned for the audio data. The video coefficient is calculated by adding a weighted sum of the image and audio coefficients (810). The weighting can be done in a plurality of ways, including a weight based on the relative proportion of audio and image data found in each video object. In addition, the weighting scheme can be adjusted by the user to reflect the relative acceptability of the adult content signalled by the image and audio coefficients.

The pseudocode for this process is as follows.
1. set videocoeff=0
2. let images=null
3. let audio=null
4. for each video component, v, in the object do
4.1. add each frame of v to images
4.2. add (concatenate) the audio stream of v to audio
5. set videocoeff=the image coefficient of images/(total number of frames)
6. set audiocoeff=the audio coefficient of the extracted audio data
7. set videocoeff=videoweight*videocoeff+audioweight*the audiocoeff of audio
8. output videocoeff The Plug-in Coefficient As technology evolves, new types of Internet objects are introduced. Producers of Internet software, most notably Netscape and Microsoft, have responded to this trend by introducing plug-ins. Plug-ins are programs that operate with viewing software, in this case web browsers and mail readers, and allow users to view Internet object types for which viewers were not originally included in the software. In most cases, these plug-ins are provided by the organization that developed the Internet object type. Current examples include Adobe's Acrobat Reader and Macromedia's Flash Player.

The invention contemplates using information about new Internet object types by allowing a third party to produce plug-ins that can compute type specific adult content coefficients for new object types. The invention would obtain plug-in data from the Internet object (902). The invention would then weight the plug-in data (904). The weighting can be done in a plurality of ways, including a weight based on the popularity of the object type for use in association with Internet objects containing adult content. In addition, the weighting scheme can be adjusted by the user to reflect the relative acceptability of the adult content signalled by the various plug-ins. The plug-in, coefficient would be calculated by adding the weighted plugin data (906), and dividing by the number of plug-ins present (908).

The pseudocode for this process is as follows.
1. set plugincoeff=0
2. for each plugin, p, appearing in the object do
2.1. set plugincoeff=plugincoeff+adult content coefficient of p*weight
3. set plugincoeff=plugincoeff/the number of plugins
4. output plugincoeff The Relational Coefficient Although text, image, audio and video analysis will find the vast majority of sites containing adult content, some sites with adult content do not contain any of the preceding types of data. For example, some sites contain very extensive listings of pornography websites, but themselves contain little text, image, audio or video data that would allow the site to be discovered using the preceding methods.

Accordingly, for Internet objects that have not yet crossed the threshold of objectionable adult content, the robot performs one final analysis based on relations between Internet objects. There are two types of relations that the robot considers: "part-of" relations, and "links-to" relations. An Internet object "A" is said to be "part-of" another Internet object "B" if A is contained in B, in some natural sense. Examples include: files in a directory, directories on a machine, machines in an Internet domain, and messages in a newsgroup. Of course, "part-of" relationships are transitive. In other words, if A is a part of B and B is a part of C, then A is a part of C. An Internet object A is said to "link to" another Internet object B if A contains a reference to B. Examples include web pages that link to other web pages and email or newsgroup postings that are replies to previous postings.

The robot does not consider "linked-to-by" relations, as the target Internet object has no control over the types of sites that link to its site. A "linked-to-by" relation is one in which the Internet object being classified is identified as having been the subject of a link from an object that has been previously classified as containing adult content. For example, many pornographic sites contain links to Internet filtering companies such as NetNanny, in order to provide consumers who wish to censor such sites with the means to do so.

Figure 10:
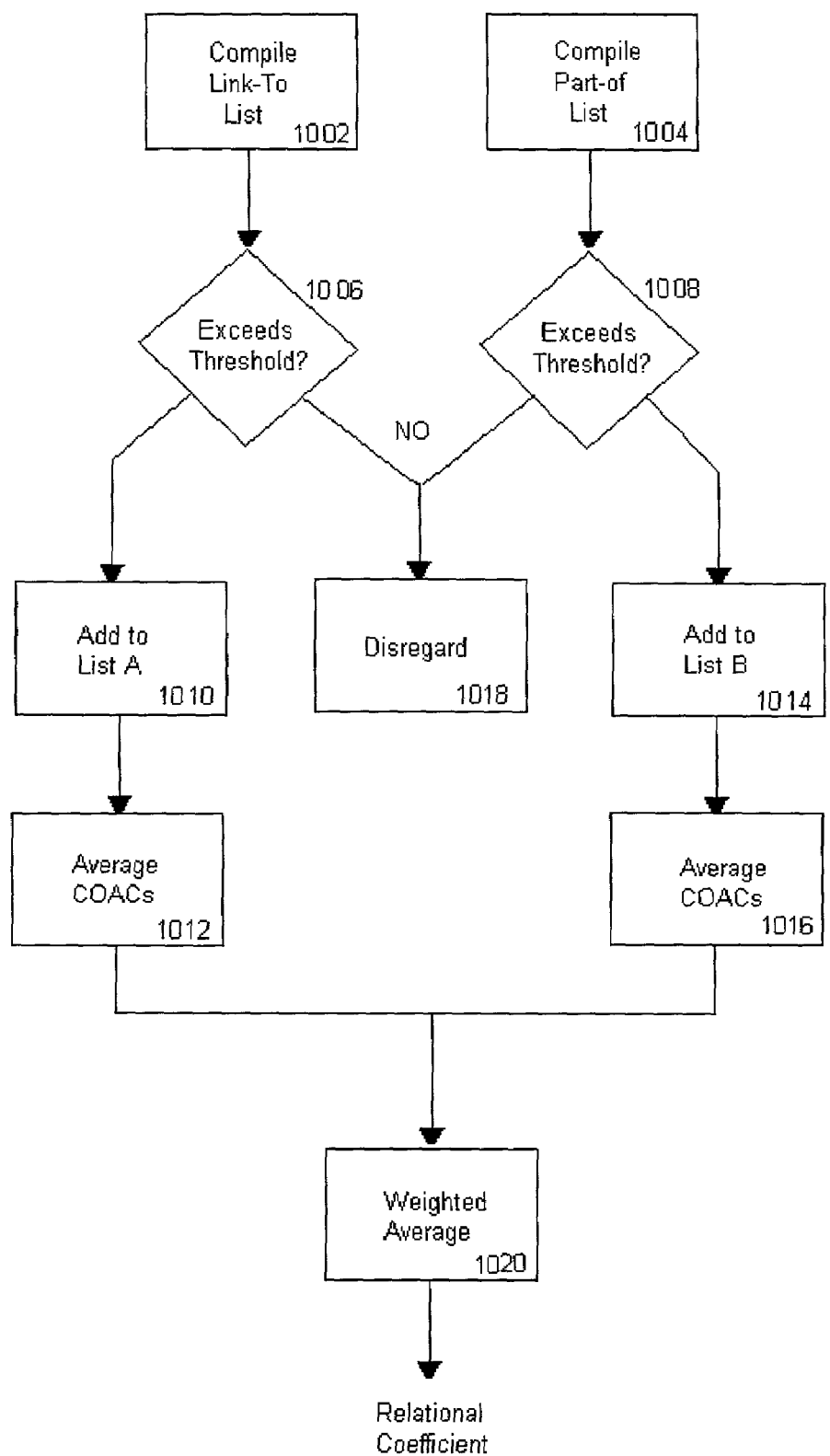
FIG. 10 is a flow chart of the calculation of the relational coefficient.

FIG. 10 illustrates the calculation of the relational coefficient. First, the robot compiles a list of all of the other Internet objects that an Internet object under consideration links to (the "linked-to" objects) (1002), as well as a list of all of the other Internet objects that an Internet object under consideration is part of (the "part of" objects) (1004).

The robot then checks the database that it has compiled of Internet objects that contain adult content to determine which of the "linked-to" objects contain adult content that exceeds the tolerated threshold for adult content (1006), and performs a similar function for the "part of" objects (1008). If the CoAC of a "linked-to" object exceeds the tolerated threshold, it is added to a list (1010). If the CoAC of a "part-of" object exceeds the tolerated threshold, it is added to a separate list (1014). Both "linked-to" objects and "part-of" objects that have CoACs that fall below the tolerated threshold are ignored (1018). The average CoAC of the "linked to" objects in the list of objects that exceed the tolerated threshold for adult content is calculated (1012), and a similar calculation is performed for "part of" objects (1016).

The relational coefficient is computed by calculating a weighted average of the average CoAC of the Internet objects in the lists of Internet objects that exceed the tolerated threshold for adult content (1020). The weighting scheme, which can be determined automatically or set by the user, can take a plurality of forms. For example, the weighting scheme may be adjusted by the user to reflect the relative acceptability of the adult content signalled by the various data type coefficients which make up the CoAC of the "linked to" objects and the "part of" objects.

This process is given by the following pseudocode.
1. set linktocoeff=0
2. for each object, o, having a "links-to" relationship with the object do
2.1. set linktocoeff=linktocoeff+the CoAC of o
3. set linktocoeff=linktocoeff/#objects having a "links-to"relationship with the object
4. set containscoeff=0
5. for each object, o, having a "contains" relationship with the object do
5.1. set containscoeff=containscoeff+the CoAC of o
6. set containscoeff=containscoeff/# objects having "contains" relationship with the object
7. set relcoeff=(linkweight*linktocoef+containsweight*containscoeff)/2
8. output relcoeff Gathering of Data The analysis set out above has been implemented and incorporated into a web robot whose goal is to find web pages with adult-content. In this section, we describe the implementation of this robot. The robot takes as input a list of URLs and visits each one of them in an attempt to determine whether they are adult content sites or not. The initial URLs are sites with a great number of links to known adult content sites. The robot uses a queue, Q, of URLs to visit, and operates as follows:
1. initialize Q with input list of URLS
2. while Q is not empty do
3. choose a random URL, u, from Q
4. if u appears to be an adult-content site then
5. add any links to HTML pages found on u to Q
6. end if
7. end while The robot maintains a list of URLs already visited so that no URL is visited more than once. Line 4 of the above algorithm is implemented as follows [where the site (hostname) of URL is denoted by site (URL); the directory of the URL on the host is denoted by directory (URL); and the domain is denoted as domain (URL) For example, if URL were http://www.scs.carleton.ca/~morin/friends.html, then site (URL) would be http://www.scs.carleton.ca, directory (URL) would be http://www.scs.carleton.ca/~morin/, and domain would be carleton.ca.]:
1. if the web page domain(URL)appears to be adult content then
2. Mark URL as adult content.
3. if the web page site(URL) appears to be adult content then
4. mark URL as adult-content
5. else if the web page directory(URL) appears to be adult content then
6. mark URL as adult content
7. else if the web page URL appears to be adult-content then
8. mark URL as adult content
9. else mark URL as not adult content If a site or directory becomes classified as adult-content then all URLs on that site or in that directory will also be classified as adult content, but the converse is not true. The robot maintains a database of URLs of sites that contain Internet objects that exceed the tolerated threshold for adult content. The database can be referenced upon executing Internet access via any communications port in any type of computer. Upon execution of Internet access, the database of URLs with adult content is referenced in order to block access to Internet addresses that have been identified as having adult content that exceeds the tolerated threshold.

It will be understood by those skilled in the art that the invention has uses in generating adult content lists for Internet filtering software. As well, the invention has application in finding and filtering Internet content as it passes through the TCP/IP stack. Sub inventions have applications in automatic censoring of pictures, movies, television, radio and other media. By sub inventions, we mean each novel data type analysis, and each novel combination of data type analyses disclosed herein. In addition, the invention and/or sub-inventions have applications in the identification and classification of Internet objects on the basis of criteria and parameters other than adult content. Accordingly, it is to be understood that the present invention is not limited to the various embodiments set forth above for illustrative purposes, but also encompasses various modifications which are rendered obvious by the present disclosure.

Figure 11:
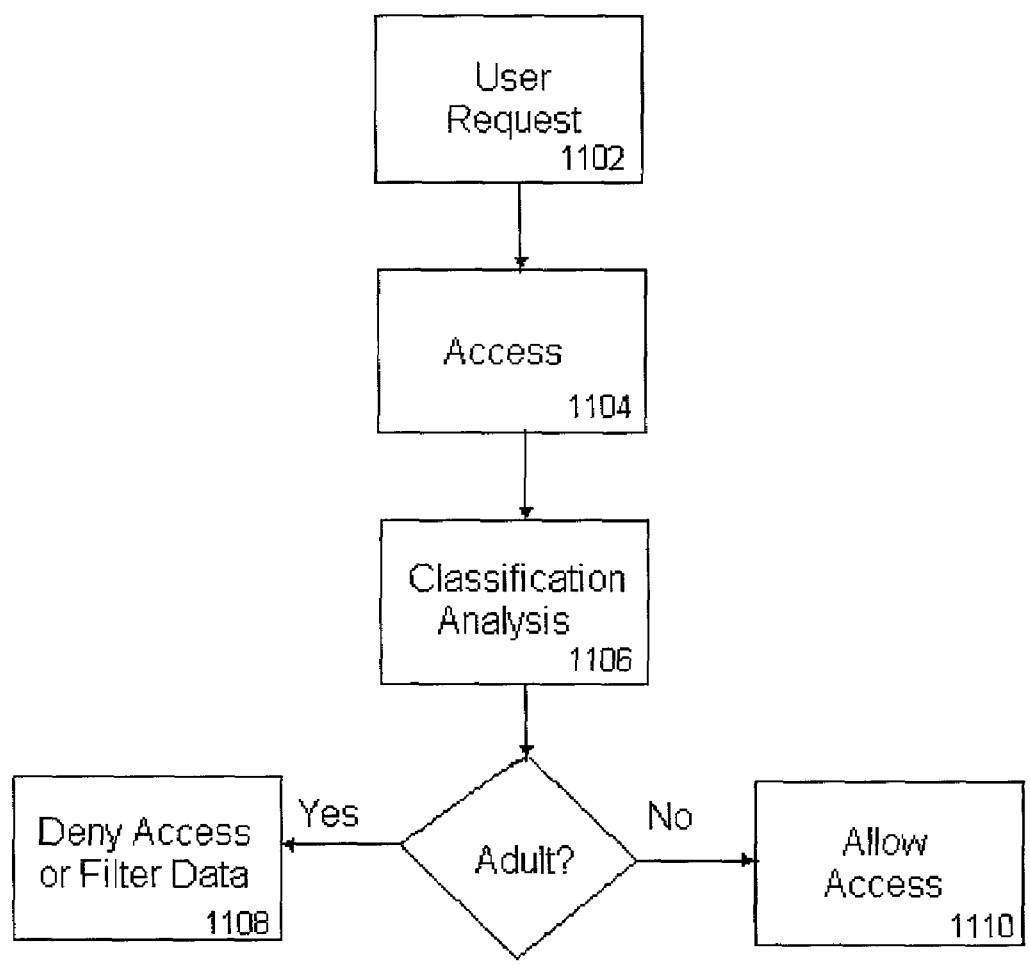
FIG. 11 is a flow chart of the steps involved in classifying and filtering access to an object containing adult content stored on computer-readable media.

The second exemplary embodiment of the invention classifies objects stored on computer-readable media by using a classification module resident on a computer system to review and classify objects stored on computer-readable media, either in a pre-processing phase or upon access to an object. The invention uses a combination of text, image, video, and audio analysis to determine whether a particular object stored on computer-readable media contains adult content, all without the need for human assessment. FIG. 11 illustrates the steps involved in this process. Upon receipt of an instruction from a user to access an object (1102), the operating system would access the media (1104), and the classification module would perform the classification analysis (1106). If an object exceeded the tolerated threshold for adult content, the classification module would filter or deny access to the object (1108). Of course, if the object did not exceed the tolerated threshold for adult content, the classification module would allow access to the object (1110).

Figure 12:
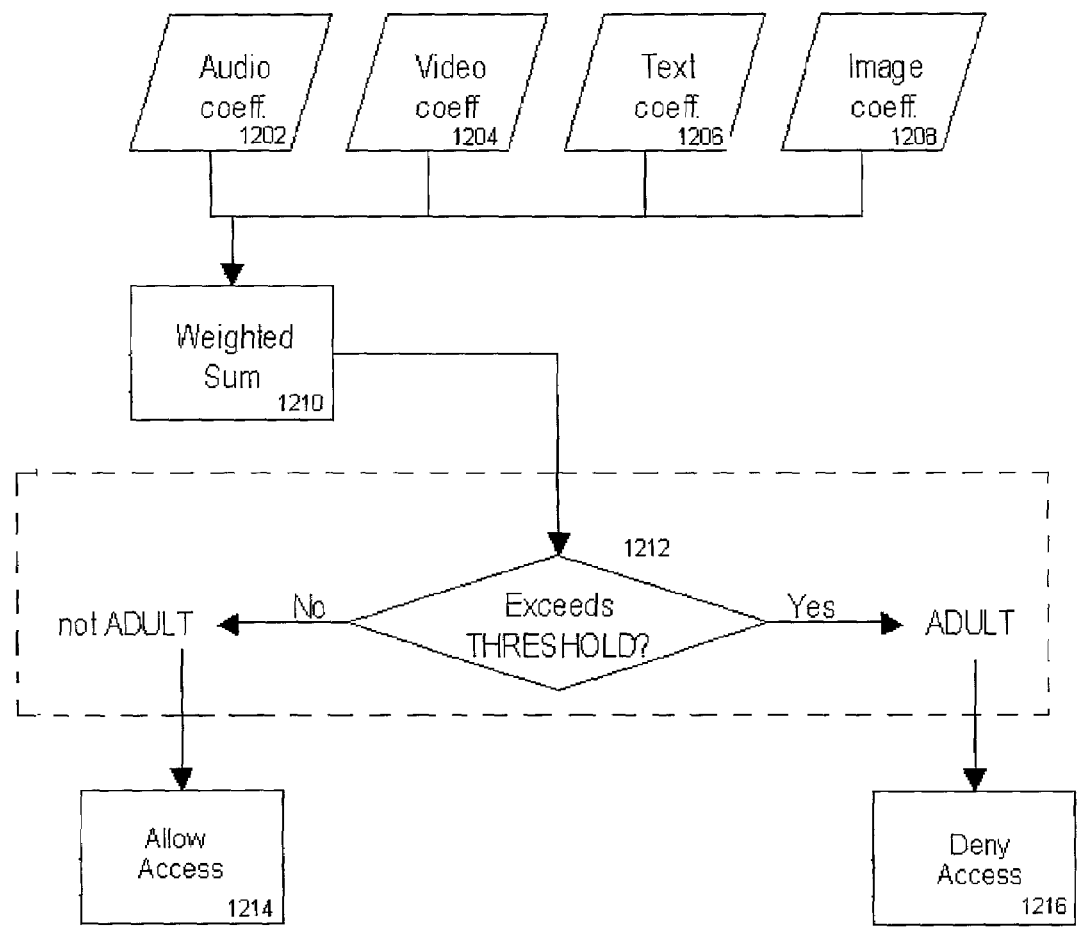
FIG. 12 is a flow chart of the calculation of the four coefficients and the calculation of the weighted sum used to classify an object stored on computer-readable media.

FIG. 12 is a more detailed diagram of the calculation of the four coefficients and the calculation of the weighted sum used to classify an object stored on computer-readable media. The invention automatically computes, without human intervention, four different values, or data type coefficients (audio coefficient (1202), video coefficient (1204), text coefficient (1206), and image coefficient (1208)). The steps for calculating the various data type coefficients are described below.

The invention then combined the various data type coefficients, using a weighting scheme, into one value (the weighted sum (1210), called the coefficient of adult content (CoAC). The weighting scheme for the weighted sum can be determined automatically or can be adjusted by the user to reflect the relative acceptability of the adult content signalled by the various data type coefficients. The weighting scheme can also be adjusted to take account of other factors, such as the prevalence of various data types in an object stored on computer-readable media. For example, in an object that contains 10 pictures and 5 words, more weight could be given to the image data type coefficients in the computed CoAC for the object.

After computing the four data type coefficients, and producing the weighted sum (CoAC (1210)), the CoAC (1210) is compared against a user-specified threshold value (1212). Any object with a CoAC (1210) exceeding this threshold is classified as containing adult content, and the classification module would filter or deny access to the object (1214). Of course, if the object did not exceed the tolerated threshold for adult content, the classification module would allow access to the object (1216).

The device which performs the method of classification of objects stored on computer-readable media is described in FIG. 1. FIG. 1 is a high-level block diagram of a system (2) that can be used to implement one or more different embodiments of the present invention. When a user makes a request on a computer system (2) via the user input devices (22) to access storage devices (32) through the input/output interface (4), the classification module (20) will be invoked by the operating system (12).

The classification module (20) will analyze the data being requested. The classification module (20) will determine, based on user-definable criteria, to either allow or disallow access to the storage devices (32) for read or write access. For example, read access to the CD-ROM may be denied because the content on the CD-ROM contains objects classified as adult content. Similarly, the classification module could be invoked when an attempt is made to write to a storage device. The classification module could then allow or disallow write access to the storage device depending on the classification of the data to be written. In an identical manner, control to any item via the input/output interface (4) is possible using the classification module (20) and the operating system (12). For example, access to a printer (28)

or network device (30) can be controlled by the classification module (20) in place of the storage devices (32) in the above example.

The method can be used to classify objects stored on computer-readable media based on any combination of the above data type coefficients, and possibly other criteria.

The Text Coefficient

Many objects stored on computer-readable media, such as text documents, contain a text component. In such cases, the text can be analyzed to determine if it contains adult content.

As set out above with respect to the calculation of the text coefficient in the classification of Internet objects, a list of keywords and phrases that are likely to indicate adult content is developed. The classification module is given access to the keyword list, which is stored on a database resident on the computer system. FIG. 5 illustrates the calculation of the text coefficient. When the classification module reviews an object stored on computer-readable media (502), it begins its analysis by eliminating, where necessary, any formatting from the text of the object to obtain an unformatted text (504). Next, the classification module reduces each individual word in the unformatted text to a stem (506), using any known stemming algorithm, for example, the Porter stemming algorithm [Porter, M. F., 1980, An Algorithm for Suffix Stripping, *Program* 14(3): 132-137]. The resulting word stems are then compared to the weighted keyword list (508). In addition, the text is searched for key phrases that exactly match key phrases in the weighted key phrase list (510). The first step in developing the numerator of the text coefficient is to add the weights of all weighted keywords found in all stemmed words and the weights of all weighted key phrases found in the original text (512). The second step in calculating the numerator of the text coefficient is to multiply the total of the weights of all stemmed words and all key phrases by a constant, which may be determined automatically or determined by the user (514). The constant, which is a mathematical function of the total number of words in the Internet object, functions as a scaling factor (or weighting factor). The denominator of the text coefficient is the number of words in the Internet object (516). The text coefficient is calculated by dividing the numerator by the denominator.

The pseudocode for this process is as follows.
1. set textcoeff=0
2. remove all formatting from the text
3. for each word, w, in the text do
3.1. reduce w to a canonical form to get a word-stem, s
3.2. if s is in the stem keyword list then
3.2.1. set textcoeff=textcoeff+the weight of s
4. for each phrase, p, in the key phrase list do
4.1. let n=the number of occurrences of p in the text
4.2. set textcoeff=textcoeff+n*the weight of p
5. set textcoeff=textcoeff*k/number of words in the text, where k is a user-defined or automatically generated constant value
6. output textcoeff The Image Coefficient When an object stored on computer-readable media contains image data, or is an image itself, the image data can be analyzed to determine whether it contains adult content. Computation of the image coefficient proceeds using the steps set out in the discussion of the image coefficient with respect to classification of Internet objects.

FIG. 6 illustrates the calculation of the image coefficient. When the classification module is reviewing images in an object stored on computer-readable media, the module begins by converting the colour of the object into the HSV colour space (602). The classification module then compares every pixel of the object image to identify which pixels fall within the skin tone ranges it has been provided (604). The module then divides the number of skin tone pixels in the object image by the total number of pixels in the image (606). The module compares the resulting value against an automatically generated or user-defined threshold value (608). If the resulting ratio is less than the threshold proportion of skin pixels, then the classification module disregards the image (610). Each image in an object stored on computer-readable media that meets or exceeds the threshold proportion of skin pixels is assigned a nudity coefficient equal to the percentage of skin pixels in the image (612). The nudity coefficient of each image in an object stored on computer-readable media can be weighted (614) using a plurality of factors, including, but not limited to, the size of the image (with larger pictures getting a heavier weight) and the encoding type (with images in formats with more accurate colour ranges getting a higher weight).

The image coefficient is calculated by adding the weights of all weighted nudity coefficients generated by an object stored on computer-readable media (616), and then multiplying that total by a constant, which may be determined automatically or determined by the user (618). The constant, which is a mathematical function of the total number of images in the object, functions as a scaling factor (or weighting factor).

The pseudocode for this process is as follows.
1. set imagecoeff=0
2. for each image, i, in the object do
2.1. set skincount=0
2.2. for each pixel, p, of i do
2.2.1. if 2<=hue(p)<=18 and 80<=saturation(p)<=230 then
2.2.1.1. set skincount=skincount+1
2.3. set skincount=skincount/number of pixels in i
2.4. set imagecoeff=imagecoeff+skincount
3. if number of images>0
3.1. set imagecoeff=imagecoeff/$\log_2$ (number of images)
4. output imagecoeff The Audio Coefficient As previously stated, certain audio data can be transcribed into text, and the resulting transcription can be analyzed using the textual classification method previously described. FIG. 7 illustrates the calculation of the audio coefficient. To obtain the audio coefficient, audio components in the object stored on computer-readable media are converted to unformatted text (702) using any known speech recognition algorithms (for example Dragon Naturally Speaking available from Dragon Systems, Inc.). The resulting texts are then put together (concatenated) (704) and their text coefficient is computed in the same manner as the method discussed with respect to the text coefficient above (706). The result is the audio coefficient.

The pseudocode for this process is as follows.
1. set audiocoeff=0
2. set text null
3. for each audio stream, s, in the object do
3.1. convert s to text to obtain text t
3.2. append t to text
4. set audiocoeff=the text coefficient of extracted text
5. output audiocoeff The Video Coefficient Video data contains components of both audio and image data. FIG. 8 illustrates the calculation of the video coefficient. The invention analyzes video data by first dividing the video data into image data (802) and audio data (804) as required by the media type. The resultant image data is evaluated using the image coefficient method (806), and an image coefficient is assigned for each frame of video data. The resultant audio data is evaluated using the audio coefficient method (808), and an audio coefficient is assigned for the audio data. The video coefficient is calculated by adding a weighted sum of the image and audio coefficients (810). The weighting can be done in a plurality of ways, including a weight based on the relative proportion of audio and image data found in each video object. In addition, the weighting scheme can be adjusted by the user to reflect the relative acceptability of the adult content signalled the image and audio coefficients.

The pseudocode for this process is as follows.
1. set videocoeff=0
2. let images=null
3. let audio=null
4. for each video component, v, in the object do
4.1. add each frame of v to images
4.2. add (concatenate) the audio stream of v to audio
5. set videocoeff=the image coefficient of images/(total number of frames)
6. set audiocoeff=the audio coefficient of the extracted audio data
7. set videocoeff=videoweight*videocoeff+audioweight*the audiocoeff of audio
8. output videocoeff Gathering of Data The analysis set out above has been implemented and incorporated into a classification module that reviews and classifies objects stored on computer-readable media, with the goal of filtering or blocking access to objects that exceed a user-defined tolerance for adult content.

It will be understood by those skilled in the art that the invention has uses in filtering or blocking access to objects stored on computer-readable media that exceed user-defined thresholds for adult content. Sub inventions have applications in automatic censoring of pictures, movies, television, radio and other media. By sub inventions, we mean each novel data type analysis and each novel combination of the data type analyses disclosed herein. In addition, the invention and/or sub-inventions have applications in the identification and classification of objects stored on computer-readable media on the basis of criteria and parameters other than adult content. Accordingly, it is to be understood that the present invention is not limited to the various embodiments set forth above for illustrative purposes, but also encompasses various modifications which are rendered obvious by the present disclosure.

We claim:

1. A computer-implemented method of classifying an Internet object comprising the steps of:
   (a) computing any combination of coefficients for the Internet object from the group of data type coefficients comprising (i) a descriptor coefficient, (ii) a name coefficient, (iii) a text coefficient, (iv) a image coefficient, (v) a audio coefficient, (vi) a video coefficient, (vii) a plug-in coefficient, and (viii) a relational coefficient;
   (b) classifying the Internet object using the any combination of coefficients by automatic comparison of the any combination of coefficients to identified criteria; and
   (c) combining and weighting all of said coefficients except for said relational coefficient, and generating a first weighted sum useable in classifying said Internet object.

2. The method as recited in claim 1, further including the steps of:
   providing a threshold value;
   determining if said first weighted sum is greater than or less than said threshold value;
   wherein said classifying step includes the acts of classifying said Internet object, such that if said first weighted sum is greater than said threshold value, said Internet object is classified as adult content.

3. The method as recited in claim 2, further including the steps of:
   computing said relational coefficient if said object is not classified as adult content in said classifying step; and
   combining and weighting all of said coefficients; and
   generating a second weighted sum.

4. The method as recited in claim 1, further including the steps of:
   providing a threshold value;
   determining if said second weighted sum is greater than or less than said threshold value;
   wherein said classifying step includes the acts of classifying said Internet object such that if said second weighted sum is greater than said threshold value, said object is classified as adult content.

5. The method as recited in claim 2, further including the step of blocking or filtering access to Internet objects that exceed the tolerated threshold for adult content by storing the URLS of sites which contain said Internet object in a database, if said first weighted sum is greater than said threshold value such that said sites can be blocked or filtered by referencing said database when the Internet is accessed.

6. The method as recited in claim 2, further including the step of blocking or filtering access to Internet objects that exceed the tolerated threshold for adult content by storing the URLS of sites which contain said Internet object in a database, if said second weighted sum is greater than said threshold value such that said sites can be blocked or filtered by referencing said database when the Internet is accessed.

7. The method as recited in claim 1 wherein said step of computing the descriptor coefficient comprises the acts of:
   identifying the PICS code in a metadata of an Internet object;
   parsing labels of said PICS code; and
   calculating a descriptor coefficient by computing the weighted average of the ratings of said labels.

8. The method as recited in claim 1 wherein said step of computing the name coefficient comprises the acts of:
   compiling a keyword list of words that are likely to indicate adult content;
   generating a weighted keyword list by assigning each word or phrase in the keyword list a weight, such that a higher weight is given to words or phrases that are more likely to indicate adult content;
   providing an automated robot with the keyword list;
   computing substrings in the name of the Internet object and comparing each substring to the weighted keyword list; and
   adding weights of all weighted keywords found in all substrings to compute the name coefficient.

9. The method as recited in claim 1 wherein said step of computing the text coefficient comprises the acts of:
   compiling a keyword and phrases list of words and phrases that are likely to indicate adult content;

assigning each word or phrase in the keyword and phrases list a weight, such that a higher weight is given to words that are more likely to indicate adult content;

providing an automated robot with the keyword and phrases list;

eliminating any formatting from the text of the Internet object to obtain an unformatted text;

reducing each individual word in the unformatted text to a stem, using a stemming algorithm;

comparing each stemmed word to the weighted keyword and phrases list;

calculating the text coefficient by first adding weights of all weighted keywords and phrases found in all stemmed words, and then multiplying that total by a scaling or weighting constant, which is a mathematical function of the total number of words in the Internet object; and dividing the resulting number by the number of words in an Internet object.

10. The method as recited in claim 1 wherein said step of computing the image coefficient comprises the acts of:

establishing a range of Hue-Saturation-Value ("HSV") colour space values for skin tones;

converting the colour of the Internet object into the HSV colour space;

comparing every pixel of the Internet object image to identify which pixels fall within the colour space values;

dividing the number of skin tone pixels in the Internet object image by the total number of pixels in the image;

disregarding images that have less than a threshold proportion of skin pixels;

assigning each image in an Internet object that meets or exceeds the threshold proportion of skin pixels a nudity coefficient equal to the percentage of skin pixels in the image;

weighting the nudity coefficient of each image in an Internet object using specified weighting;

calculating the image coefficient by first adding together all of the weighted nudity coefficients generated by an Internet object; and multiplying the total of all weighted nudity coefficients by a scaling or weighting constant, which is a mathematical function of the total number of images in the Internet object.

11. The method as recited in claim 1 wherein said step of computing the audio coefficient comprises the acts of:

converting any audio components in the Internet object into unformatted text using a speech recognition algorithm;

concatenating the text data; and evaluating the resultant text data using the ads set out in claim 9 (i.e. text coefficient), and assigning a text coefficient using the acts set out in steps (a) to (b) of claim 9 to the resultant text.

12. The method as recited in claim 1 wherein said step of computing the video coefficient comprises the acts of:

dividing the video data into image and audio data as required by the media type;

valuating the resultant image data using the acts set out in claim 10 (i.e. image coefficient), and assigning an image coefficient for each frame of video data using the acts set out in acts (a) to (i) of claim 10 above;

evaluating the resultant audio data using the acts set out in claim 11 above (i.e. audio coefficient [method]), and assigning an audio coefficient for the audio data using the acts set out in steps (a) to (c) of claim 11 above; and calculating the video coefficient by adding a weighted sum of the image and audio coefficients, with weighting being determined automatically or can be set by the user.

13. The method as recited in claim 1 wherein said step of computing the relational coefficient comprises the acts of:

determining whether the CoAC of an Internet object, using the calculations in the following individual coefficients (i) the descriptor coefficient, (ii) the name coefficient (iii) the text coefficient, (iv) the image coefficient, (v) the audio coefficient (vi) the video coefficient, and (vii) the plug-in coefficient, results in a CoAC greater than a tolerated threshold;

if not engaging in calculation of the relational coefficient by compiling a list of all Internet objects that the Internet object under consideration links to (the "linked-to objects"), as well as a list of all Internet objects that the Internet object under consideration is part of (the "part of objects");

checking the database referred to in claim 5 to determine which of the "linked-to" objects and "part of" objects contain adult content that exceeds the tolerated threshold;

calculating an average CoAC of both the "linked to" objects and the "part of" objects that exceed the tolerated thresholds for adult content; and calculating the relational coefficient by calculating a weighted average of the two averages determined in part (d) above, in which weighting can be determined automatically or can be set by the user.

14. A computer-implemented method of classifying an Internet object or an object stored on computer-readable media by identifying adult content by the amount of nudity found in the object, the method comprising the steps of:

(a) establishing a range of Hue-Saturation-Value ("HSV") colour space values that are classified as skin tones;

(b) upon reviewing images in an object, converting the colour of the object into the HSV colour space;

(c) comparing every pixel of the object image to identify which pixels fall within the skin tone ranges established in step (a) above;

(d) dividing the number of skin tone pixels in the object image by the total number of pixels in the image;

(e) disregarding images that have less than a threshold proportion of skin pixels;

(f) assigning each image in an object that meets or exceeds the threshold proportion of skin pixels a nudity coefficient equal to the percentage of skin pixels in the image;

(g) weighting the nudity co-efficient of each image in an object by determining the size of the image;

(h) calculating the image coefficient by first adding together all of the weighted nudity coefficients generated by an object;

(i) multiplying the total of all weighted nudity coefficients by a scaling or weighting constant, which is a mathematical function of the total number of images in the object; and (j) classifying the object using said weighted nudity coefficients.

15. A computer-implemented method of classifying an Internet object or an object stored on computer-readable media by identifying objects with adult content on the basis of the amount of adult content found in audio components of the object, the method comprising the steps of:

(a) converting any audio components in the object into unformatted text using any known speech recognition algorithm;
(b) concatenating the text data;
(c) evaluating the resultant text data using the method set out in acts (a) to (h) of claim 9 above (i.e. text coefficient), and assigning a text coefficient using the method set out in steps (a) to (h) of claim 9 to the resultant text;
(d) classifying said object using said text coefficient.

16. A method of classifying an internet object or an object stored on computer-readable media by identifying objects with adult content on the basis of the amount of adult content found in video components of the object, the method comprising the steps of:
(a) dividing the video data into image and audio data as required by the media type;
(b) evaluating the resultant image data using the acts set out in acts (a) to (i) of claim 10 (i.e. image coefficient), and assigning an image coefficient for each frame of video data using the acts set out in acts (a) to (i) of claim 10 above;
(c) evaluating the resultant audio data using the acts set out in acts (a) to (c) of claim 11 (i.e. audio coefficient), and assigning an audio coefficient for the audio data using the acts set out in acts (a) to (c) of claim 11;
(d) calculating the video coefficient by adding a weighted sum of the image and audio coefficients, in which weighting can be determined automatically or can be set by the user; and
(e) providing a classification for the Internet object.

17. The method as recited in claim 13, further comprising the step of calculating a weighted number to describe the coefficient of adult content ("CoAC") in order to identify adult content.

18. The method as recited in claim 13, wherein said act of computing the audio coefficient comprises the acts of:
(a) converting any audio components in the object stored on computer-readable media into unformatted text using any known speech recognition algorithim;
(b) concatenating the text; and
(c) evaluating the resultant text data using the method set out in acts (a) to (h) of claim 9 (i.e. text coefficient), and assigning a text coefficient using the acts set out in acts (a) to (h) of claim 9 to the resultant text.

19. The method as recited in claim 1 wherein the identified criteria comprises adult content criteria.

20. The method as recited in claim 1 wherein the identified criteria comprises criteria other than adult content.

21. The method as recited in claim 1, wherein the identified criteria is predetermined.

22. The method as recited in claim 1, wherein the identified criteria is user-definable.

23. The method as recited in claim 1, further comprising a step of filtering the Internet object whereby the Internet object is filtered based on classification.

24. The method as recited in claim 23, wherein the step of filtering Internet content is carried out as the Internet object passes through a TCP/IP stack.

25. The method as recited in claim 1, further comprising the step of censoring the Internet object.

26. The method as recited in claim 25, wherein the censoring step results in censoring of pictures, movies, television, radio and other media.

27. The method as recited in claim 1, further comprising the step of denying access to the Internet object.

28. The method as recited in claim 1, further comprising the step of allowing access to the Internet object.

29. The method as recited in claim 1, further comprising the step of controlling a component of a computer based on the classification of the Internet object.

30. The method as recited in claim 1, wherein the component of the computer in the controlling step is a printer.

31. The method as recited in claim 29, wherein the component of the computer in the controlling step is a network device.

32. The method as recited in claim 29, wherein the component of the computer in the controlling step is a storage device.

33. The method as recited in claim 29, wherein the component of the computer in the controlling step is a display.

34. A computer readable memory having recorded thereon statements and instructions for execution by a computer to carry out the method of claim 1.

35. A computer readable memory having recorded thereon statements and instructions for execution by a computer to carry out the method of claim 14.

36. A computer readable memory having recorded thereon statements and instructions for execution by a computer to carry out the method of claim 15.

37. A computer readable memory having recorded thereon statements and instructions for execution by a computer to carry out the method of claim 16.

* * * * *